United States Patent Office 3,751,336
Patented Aug. 7, 1973

3,751,336
CONTROL DEVICE FOR PEBBLE-BED NUCLEAR REACTORS
Antonio Angelini, Mannheim, Hubert Handel, Burstadt, Heinz Landwehr, Edingen, Josef Schoning, Hambrucken, Bernd Schwenk, Heddesheim, Gerhard Ruck, Ludwigshafen-Oggersheim, and Karlheinz Hammelmann, Julich, Germany, assignors to Hochtemperatur-Reaktorbau GmbH, Cologne, and Kernforschungsanlage Julich GmbH, Julich, Germany
Filed Dec. 18, 1969, Ser. No. 886,152
Claims priority, application Germany, Dec. 20, 1968, P 18 15 916.5; Sept. 13, 1969, P 19 46 540.8
(Filed under Rule 47(a) and 35 U.S.C. 116)
Int. Cl. G21c 7/10
U.S. Cl. 176—36 R                2 Claims

ABSTRACT OF THE DISCLOSURE

A control device for regulating a pebble-bed nuclear reactor including an absorber rod movable longitudinally to displace reactor core elements, said rod having at least one helical groove formed on the exterior of that part of the rod which penetrates the core. Drive means are provided whereby both longitudinal and rotary movements may be imparted to the rod, the movements being such as to act in conjunction with the sense of the helical groove so to facilitate insertion and/or withdrawal of the rod by assisting the displacement of core elements.

---

Figure 1:
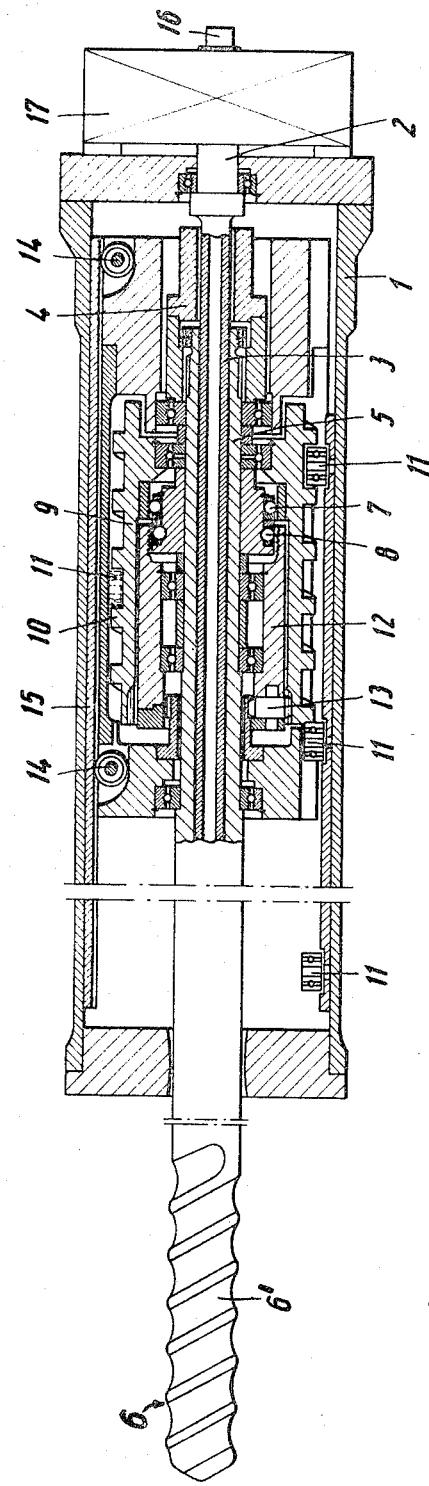

This invention relates to a control device for regulating pebble-bed nuclear reactors. In particular it is concerned with an absorber rod which may be inserted directly into the core of such a reactor, thereby displacing some of the core elements.

Pebble-bed nuclear reactors in which the control or shut-down operations are carried out using absorber rods which directly penetrate the bank of core elements are already known. Apart from being very efficient, a regulating operation of this kind offers advantages in regard to the construction of the core of the reactor, since special assemblies for guiding the control or shut-down rods becomes unnecessary. The absorber rods which, apart from passages for a coolant, are generally of solid form, usually have tapered ends but can nevertheless cause stressing of the reactor core when the core elements are being displaced. This can lead to the application of impermissibly high loads to the core elements and to the lateral and bottom reflector.

An object of the invention is to provide a control device for a pebble-bed nuclear reactor, the use of which device results in a reduction of the loads applied to the core elements during penetration of the bank.

Accordingly the invention provides a control device for regulating a pebble-bed nuclear reactor comprising an absorber rod mounted for rotation about its longitudinal axis, and for longitudinal movement in the direction of said axis whereby to penetrate the core of said reactor and to displace the elements of said core, said rod having at least one helical groove formed in its exterior surface at least over that part of its length which penetrates the core. Preferably the device further includes drive means for imparting both longitudinal and rotary movement to said rod.

An absorber rod having a helical groove may be more easily inserted into a bank of core elements, especially when driven in the preferred way, since the absorber rod acts in the manner of a screw and hence loosens the packing of the elements as it penetrates the core. Some of the elements disposed in the path of the inwardly moving absorber rod are pushed upwards, so that the number of elements displaced by the absorber rod in a direction such that heavy working loads are applied to the core elements and to the lateral and bottom reflectors is considerably reduced. The helical groove contained in the absorber rod can be of any one of large number of possible cross-sectional forms, but is expediently of trapezoidal cross-section. The leading end of the absorber rod is advantageously tapered somewhat, so as to ensure a continuous screw action.

The associated drive means preferably comprises a prime mover, a drive shaft connected to the prime mover, a casing in which the drive shaft is mounted, the shaft being formed with longitudinal grooves for at least part of its length in the casing, a coaxial axially-movable torque-transmission element mounted on said part of the shaft, an axially-movable tubular member drivingly connected to the torque transmission element which member is connected at its end remote from said element to the absorber rod, a lifting screw rotatably surrounding said tubular member, said screw having an external screw thread, a counter thread formed on the inner surface of the casing which thread engages with the thread of the lifting screw, axial guides formed on the inner surface of the casing whereby the longitudinal movement of the lifting screw is controlled and a disengageable slip coupling arranged between the lifting screw and the tubular member whereby longitudinal movement may be imparted to said member from said screw when said coupling is engaged.

The drive means may also include an intermediate member coaxial with and rotatably mounted on the tubular member, gearing arranged between said intermediate member and the lifting screw, and a further disengageable slip coupling arranged between said intermediate and tubular members whereby the lifting screw may be driven at different velocities dependent on which of the slip couplings is engaged.

Based on numerous tests on models scaled 1:10 and 1:1, the optimum travel ratio defined as the ratio of the speed of movement of the absorber rod to the lifting speed of the lifting screw was found to be 1.5 for insertion of the rod and 1.0 for retraction. It is thus seen that the drive means should preferably provide different travel ratios or velocities for the insertion and retraction of the absorber rod and accordingly gearing is incorporated into the drive means. Expediently, the gearing takes the form of a planetary gear system.

The lifting screw preferably has a square thread, the pitch of which is 93 mm., the counter-thread for the lifting screw being formed by ball-bearing rollers arranged in the casing to correspond to the pitch of the thread. The ball-bearing rollers are, disadvantageously, so arranged that at least three and at most four rollers are simultaneously in engagement. The torque-transmission from the grooved shaft to the tubular part is expediently achieved by a sliding ball bush.

The function of the axial guides is to resist transverse forces and they preferably take the form of runners engaged in tracks appropriately disposed longitudinally within the casing. For the purpose of indicating the position of the absorber rod there may be provided an impulse transmitter fitted directly to the stub of the shaft of the driving motor. The number of revolutions or partial revolutions is thereby counted and may be indicated by appropriate means. The number of counting impulses constitutes a measure for determining the position of the absorber rod.

Figure 2:
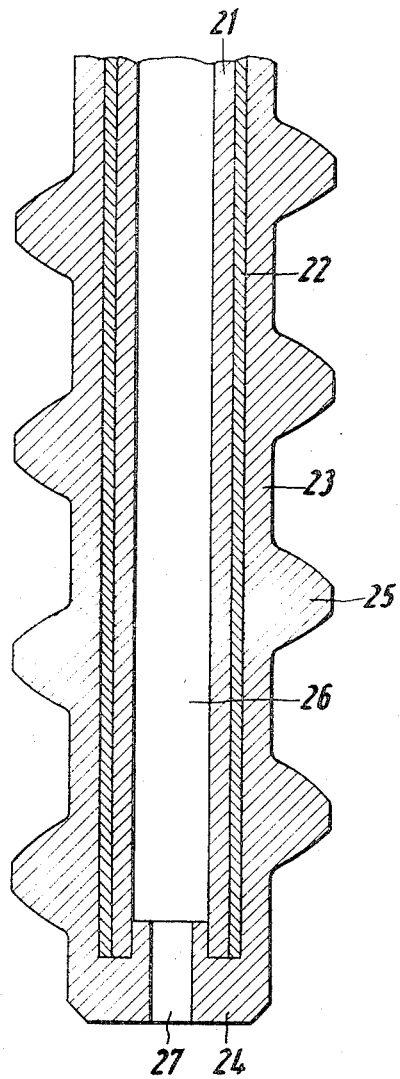

Reference is hereinafter made to the accompanying schematic drawings which illustrate by way of example a control device of the invention, FIG. 1 showing a longitudinal section of a control device comprising an absorber rod and its driving means, and FIG. 2 showing a longitudinal section of part of an absorber rod.

Referring to FIG. 1, the device comprises a casing 1 in which is located a drive shaft 2, a part 3 of which takes the form of a splined shaft, which passes through a torque-transmission element comprising a sliding ball bush 4. The sliding ball bush 4 is connected to an axially displaceable tubular member 5, to the lower end of which is connected an absorber rod 6 having on its surface a groove 6' extending over a helical path. On the periphery of the tubular member 5 and near the sliding ball bush 4 there are provided first and second slip couplings 7 and 8, which can be respectively engaged and disengaged according to the direction of rotation of the tubular member 5. The slip coupling 7 may be directly connected to a lifting screw 9, the square thread 10 of which engages in a counter-thread constituted by ball-bearing rollers 11, which are fitted on the inner circumference of the casing 1. The other slip coupling 8 engages in one end face of a coaxial intermediate member 12, at the other end face of which is fitted a planetary gear 13. The planetary gear 13 is connected to the lifting screw 9 in a mechanically positive manner. The axially displaceable parts, i.e., the tubular member 5 and the lifting screw 9, are guided by means of axial guides which consist of runners 14 in conjunction with tracks 15 disposed within the housing 1. For the purpose of indicating the position of the absorber rod 6 there is provided an impulse transmitter 16 which is fitted on the stub of the drive shaft 2 protruding from a motor 17.

The regulating device operates as follows: depending upon the direction in which the driving motor 17 is turning, the absorber rod 6 is moved into or out of the bank of core elements. When the absorber rod 6 is driven in, the rotary movement of the lower part 3 of the drive shaft 2 is transmitted directly to the sliding ball bush 4. The latter transmits the moment of rotation to the tubular member 5 via its splined connection and thus to the absorber rod 6. A longitudinal movement takes place simultaneously by way of the engaged slip coupling 7, which is firmly connected to the tubular member 5 and to the lifting screw 9 which by virtue of its engagement with the counter-thread advances the tubular member 5 along the part 3 of the drive shaft 2. When the direction of rotation is reversed, e.g. for retracting the absorber rod 6 from the bank of core elements, the moment of rotation is transmitted by the part 3 of the drive shaft 2, through the bush 4 to the tubular member 5 and the absorber rod 6 as before. The transmission of torque to the lifting screw 9 now takes place by way of the other slip coupling 8, which operates in a direction opposite to that of the slip coupling 7, and by way of the intermediate member 12 and the planetary gear 13, which directly meshes with the lifting screw 9. Thus, depending upon the required direction of rotation, one of the two slip couplings 7 and 8 engages and the other disengages. It may be seen that the provision of gearing between the intermediate member 12 and the lifting screw 9 allows different travel ratios or velocities dependent on the direction of rotation of the motor 17.

The above-described arrangement can be used for one or more absorber rods inside the core of a reactor.

FIG. 2 shows in section part of an absorber rod. As shown, this rod comprises a carrier tube 21 which is surrounded by a layer 22 of neutron-absorbing material. This layer is in turn surrounded by an outer tubular jacket 23 of heat resisting steel. At its end 24 which enters the reactor core the outer jacket is conveniently tapered or pointed to facilitate passage between the core elements. On its outer surface the jacket is formed over at least that part of its length which penetrates the reactor core in the manner of a screw with threads 25. The grooves or threads may be of any suitable shape in cross section but as illustrated their shape is generally trapezoidal. One or more than one such groove or thread may be provided after the manner of single or multi-start screw threads.

It will be appreciated that the illustrated absorber rod is substantially solid apart from a central hole 26 through which a coolant may be passed into the reactor core through the orifice 27.

We claim:

1. In combination with a pebble-bed nuclear reactor having a core comprising a plurality of pebble-like core elements, an improved control device for regulating said reactor, said control device comprising, in combination:
   (a) at least one longitudinally elongated neutron absorber rod having a free end for penetration into said bed of pebble-like core elements;
   (b) said rod being in the general form of a screw or helix having at least one helical groove formed in its exterior surface beginning at said free end and extending at least over a predetermined portion of the rod length which is penetratable into said core elements; and
   (c) means for mounting and driving said absorber rod at the other end thereof for combined rotation about its longitudinal axis and for axially longitudinal movement to helically penetrate in screw fashion into and be withdrawn from said bed of reactor core pebble-like elements, thereby both assisting in the loosening displacement of and also alleviating impermissibly high loads upon said core elements.

2. The combination according to claim 1, in which said groove is of trapezoidal cross section.

References Cited

UNITED STATES PATENTS

| | | | |
|---|---|---|---|
| 2,480,537 | 8/1949 | Arps et al. | 175—203 X |
| 2,780,740 | 2/1957 | Roman et al. | 176—36 UR |
| 3,050,943 | 8/1962 | Thorel et al. | 176—36 R |
| 3,095,051 | 6/1963 | Robinsky et al. | 175—323 X |
| 3,179,569 | 4/1965 | Fortescue et al. | 176—36 R |
| 3,519,536 | 7/1970 | Rausch | 176—36 |

FOREIGN PATENTS

| | | |
|---|---|---|
| 39,446 | 1/1964 | Japan. |
| 862,324 | 3/1961 | Great Britain. |

BENJAMIN R. PADGETT, Primary Examiner

H. E. BEHREND, Assistant Examiner

U.S. Cl. X.R.

176—86 R